United States Patent [19]
Bonnet et al.

[11] Patent Number: 5,197,095
[45] Date of Patent: Mar. 23, 1993

[54] SYSTEM FOR REMOTE TRANSFER AND COLLECTION OF DATA, IN PARTICULAR FROM METERS

[75] Inventors: Jean-Loup Bonnet, Paris; Yves Jurado, Vanves, both of France; Holger Korner, Oldenburg, Fed. Rep. of Germany

[73] Assignee: Schlumberger Industries, Montrouge, France

[21] Appl. No.: 678,283

[22] PCT Filed: Oct. 13, 1989

[86] PCT No.: PCT/FR89/00529
§ 371 Date: Apr. 12, 1991
§ 102(e) Date: Apr. 12, 1991

[87] PCT Pub. No.: WO90/04315
PCT Pub. Date: Apr. 19, 1990

[30] Foreign Application Priority Data
Oct. 15, 1988 [DE] Fed. Rep. of Germany ....... 3835145
Nov. 24, 1988 [FR] France ................... 88 15317

[51] Int. Cl.⁵ .......................................... H04M 11/00
[52] U.S. Cl. ................................... 379/107; 379/106; 379/102
[58] Field of Search ............... 319/107, 106, 102, 104, 319/105

[56] References Cited

U.S. PATENT DOCUMENTS

| | | | |
|---|---|---|---|
| 3,445,813 | 5/1969 | Price | 340/825.52 |
| 3,729,710 | 4/1973 | Sherwin . | |
| 3,937,890 | 2/1976 | Blethen et al. | 379/107 |
| 3,962,545 | 6/1976 | Abe | 379/107 |
| 4,455,453 | 6/1984 | Parasekvakos et al. | 379/106 |

FOREIGN PATENT DOCUMENTS

| | | | |
|---|---|---|---|
| 0478869 | 11/1974 | Australia | 379/107 |
| 2309104 | 11/1976 | France . | |
| 2582894 | 12/1986 | France . | |

OTHER PUBLICATIONS

The Article "Utility Pins Hopes on Meter Reading System" by Donald L. Schlenger, published Nov. 18, 1985.

*Primary Examiner*—James L. Dwyer
*Assistant Examiner*—Jason Chan
*Attorney, Agent, or Firm*—Dale V. Gaudier

[57] ABSTRACT

A system for remote transfer and collection of data such as quantities of energy of fluid measured by a utility meter. Each meter includes a unit for storing and transmitting date from the meter to a remote data collector via at least one common wire connection. The switch contains a memory having a unique ID code. The switch is selectively closed in response to an interrogation signal bearing the ID code of the switch in order to enable a stream of data to pass from the meter to the data collector, this stream of data including a meter identity indication different from the switch ID code.

4 Claims, 4 Drawing Sheets

SYSTEM FOR REMOTE TRANSFER AND COLLECTION OF DATA, IN PARTICULAR FROM METERS

FIELD OF THE INVENTION

The present invention relates to a system for remotely transferring and collecting data, in particular from meters such as water, gas, or electricity meters.

BACKGROUND OF THE INVENTION

Meters installed in buildings for industrial or domestic use measure a quantity of energy (electricity) or of fluid (water, gas) consumed; some meters are suitable for storing data relating to consumption in a memory, e.g. in accumulated form by means of a totalizer having wheels. This data is used by the operating organization to bill the consumer. To obtain the data, it is common practice to read each meter visually. In order to reduce personnel costs and the time taken by such operations, proposals have been made, in known manner, to read meters remotely by means of "remote reading" or "remote relaying" systems comprising centralized collection means connected to each meter by a network of wire connections and suitable for collecting and storing data from each of the meters, generally on a periodic basis. The output from the collection means is connected to processing and/or communication means.

In addition to the advantages mentioned above compared with visual meter reading, remote reading or remote relaying firstly provides better safety by monitoring meters on a quasi-continuous basis, and secondly provides better management of user consumption.

Such systems are already known, as applies in particular to water meters.

A first family of known systems makes use of an existing communications network.

In a first example (CMR), the system uses a coaxial television cable connecting a central transmitter to a plurality of buildings (each containing one or more meters). The centralized collection means are connected to said cable. Each meter is connected to the cable via a device suitable for interrogating the corresponding meter. Interrogation and data transmission are performed in a random sequence imposed by said interrogation device.

In a second example, the system uses a telephone network connecting buildings containing meters to a telephone exchange itself connected by telephone line to premises belonging to the organization that distributes energy, water, or gas, and where the collection means are situated. Each meter is connected to an interrogation device which is normally in a standby state. The connection means control the exchange to actuate the interrogation device which, once "woken up", interrogates the meter and transmits the data to the exchange which in turn transmits the data to the collection means.

In a third known example, each meter is connected to a memory, itself connected to means for telephone communication via a modem which is connected to the telephone network.

Although these prior systems are satisfactory from certain points of view such as security and reliability, they nevertheless suffer from drawbacks.

A system in accordance with the first example requires an electrical power supply for the interrogation device. The system of the third example is expensive given that each meter has its own modem and its own telephone number.

In addition, systems in accordance with the first, second, and third above examples all make use of interrogation devices that are relatively expensive, and since they rely on an existing communications network, they can firstly only be installed in areas that are already provided with such networks, and secondly special precautions need to be taken to avoid interference between transmitting meter data and the original function of the network.

A second family of systems is also known which are provided with their own communication means.

A first known type of system (AKUDOM) comprises centralized collection means connected by a star network to each of the meters. The meters are of the "pulse emitting" type and are suitable for delivering a signal comprising one pulse per unit volume of water flow.

Although relatively cheap and of satisfactory reliability (the data from each meter is correctly identified), this prior system suffers from the drawbacks of requiring individual connections to each meter, and of being suitable for a limited range of applications only, given limitations firstly on the number of meters that can be connected in the system and secondly on the distance that may exist between each meter and the collection means.

A second type of known system (MAYA) includes central collection means connected by a common connection to a series of primary collection devices, each of which is connected to a plurality of "pulse-emitting" meters. On instructions from the central collection means, each primary collection device sequentially interrogates each of its meters.

This known system suffers from unacceptable drawbacks. The identity code for each meter is located in its primary collection device, and this is inconvenient both with respect to reliability and with respect to flexibility (when changing meters). In addition, having a primary collection device sharing a plurality of meters implies that the meters are distant therefrom and consequently increases the cost and the complexity of cabling.

Furthermore, the first and second types of system mentioned above both suffer from a defect specific to pulse-emitting meters, namely that they allow only relative encoding of the quantity of water consumed.

From U.S. Pat. No. 3,445,813 and from French patent application FR-A-2 582 894 a system is also known for remote transfer and collection of data, the system comprising a central unit and a plurality of addressable satellite units connected to one another via a common line, and in which data transmitted by a satellite unit to the central unit may include, in particular, the address of the satellite unit. However, such a system suffers from a lack of flexibility in operation, particularly with respect to updating the central unit with information about the satellite units.

In conclusion, it will be understood that a need is felt for a remote meter reading system which is simultaneously cheap to manufacture, to install, and to operate, reliable (both with respect to data transmission and with respect to data origin), flexible in use (making it simple to change a meter and to add and/or remove meters on the communication network), and which does not rely on an existing communication network.

SUMMARY OF THE INVENTION

The system of the invention seeks to remedy the abovementioned drawbacks of known systems while simultaneously tending to present the above required advantages.

To this end, the present invention provides a system for remote transfer and collection of data such as quantities of energy or fluid measured by meters, each meter including a unit for storing and transmitting data, said system comprising: collection means connected to a common connection; and a normally open addressable switch member for each meter disposed between said common wire connection and the meter in question and suitable for closing after a signal corresponding to its address has been sent by the collection means over said common wire connection, thereby authorizing a stream of data to pass from the corresponding transmission unit towards said collection means, the system being characterized by the facts that each storage unit contains data relating to the identity of the meter, which data is independent of the address of the switch member, which address corresponds to the physical address of the switch, and that each corresponding transmission unit is adapted to transmit said data relating to the identity of the meter to said collection means.

Advantageously, the common connection is constituted by a first connection for passing data and a second connection for controlling the switch member.

More precisely, the collection means are connected to a source of electrical power and the second connection is designed also to feed each switch circuit with electrical power.

The common connection is preferably constituted by two telephone cable pairs.

In an advantageous embodiment, each switch circuit is disposed on the common connection and is connected to the corresponding meter by an auxiliary connection.

In another possible embodiment, each switch circuit is disposed at the end of an auxiliary connection connected as a branch on the common line.

The switch member is housed, for example, in a box or a socket which is connected to the end of the auxiliary line and which is suitable for connection to the meter.

Identification of each meter is made possible by the fact that the collection means comprise means for transmitting an identity signal specific to each of the switch members, each switch member comprising means for storing a reference signal corresponding to said identity signal and means for comparing the reference signal with the transmitted signal and suitable for controlling closure means for closing the electrical circuit connecting the corresponding transmission unit to the collection means.

The transmitter means are suitable for transmitting an analog signal. In a variant the transmitter means transmit a digital signal.

In a first implementation, the collection means are suitable for transmitting identity signals continuously or periodically, with the closure means being actuated while the signal belonging to the corresponding switch member is being transmitted.

In a second implementation, the identity signal is transmitted on a first occasion for closing the switch and on a second occasion for opening it.

Advantageously, the analog identity signal has a given frequency spectrum and the comparator means are constituted by a bandpass frequency filter.

In a particular embodiment, the data includes two types of information: information relating to the number of the meter, which data is recorded in unalterable manner in a memory integral with the meter, and data relating to energy or fluid consumption, which data is contained in a storage unit likewise integral with the meter.

The reference signal associated with the switch member corresponds, for example, to the physical address of the switch and thus to its billing address.

In this way, when a meter is changed at the switch member, there is no need for manual inputting or recording of changes relating to the meter number at the collection means.

The invention will be well understood in the light of the following description made with reference to the accompanying drawings, in which:

DETAILED DESCRIPTION OF PREFERRED EMBODIMENTS

Figure 1:
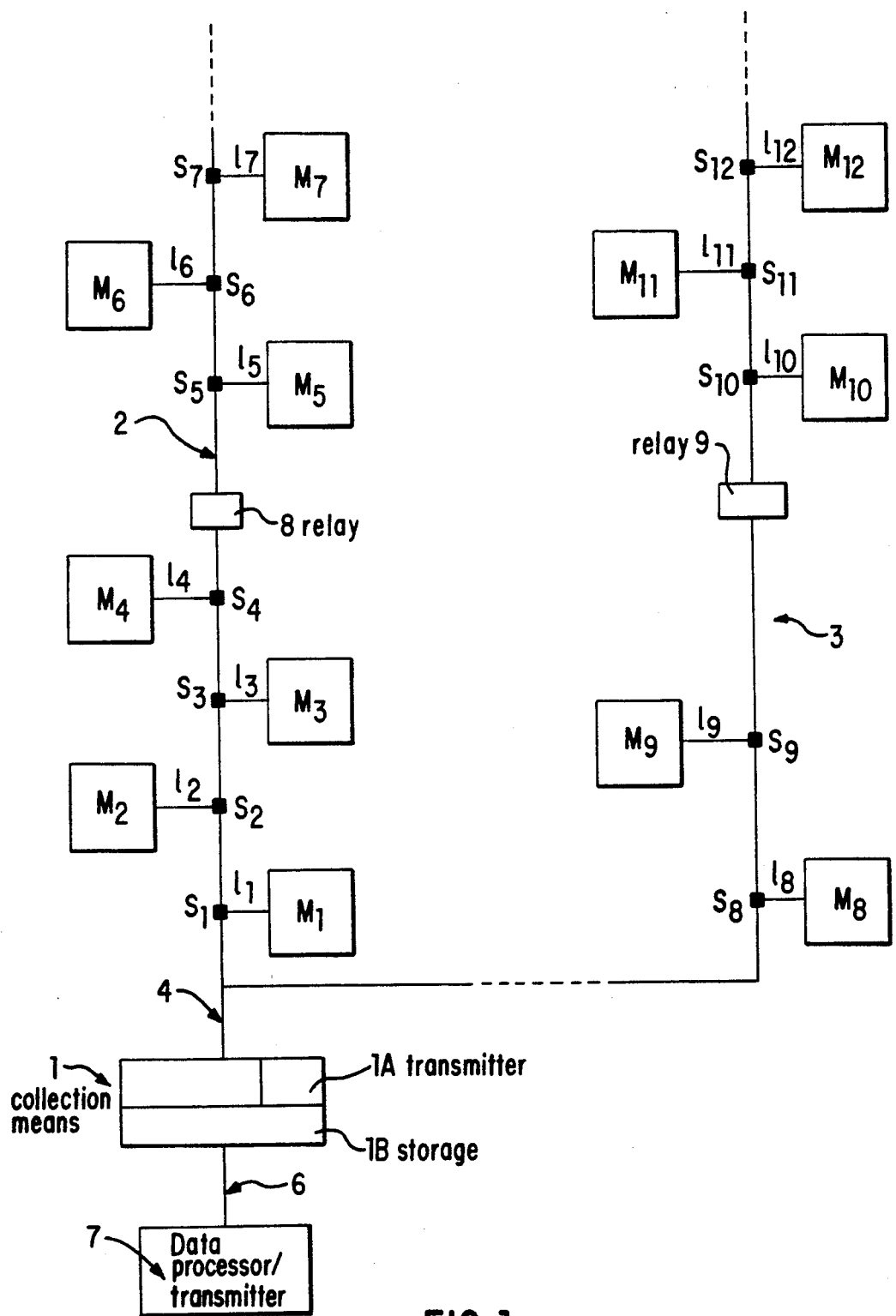
FIG. 1 is a block diagram of a first embodiment of a system of the invention.

The system of the invention shown in FIG. 1 comprises a plurality of meters, e.g. water meters, given references M1, M2, ..., M12. Each meter corresponds to a consumption module or to a portion of a consumption module such as an individual house or an apartment within a building. The system further comprises centralized collection means 1 disposed either in a building that includes the consumption modules or else in a building which is distinct and at a distance therefrom. A plurality of meters are connected to the collection means 1 via a common communication line, namely, in the example described, a common line 2 for meters M1 to M7 and a common line 3 for meters M8 to M12. The lines 2 and 3 have a common portion 4 connected to the collection means 1.

Naturally the invention is applied to a set of meters integrated either in a collective habitat (one or more buildings) or else in an individual habitat (a plurality of spaced-apart houses).

Each meter Mi (i=1 to 12) incorporates a storage and transmission unit for data relating to water consumption. The unit (not shown) is of conventional type and may be constituted, by example, by totalizing wheels and by means suitable for transforming its information (constituted by the positions of the various rollers) into electrical signals. One example of such means is given by the system sold by the American company Schlumberger Industries, under the commercial name ARB.

In addition, each meter Mi is connected to the common line 2 (or 3) via an auxiliary line $l_i$ and a switch member Si disposed on the common line. The same index i is used for each triplet comprising a meter M, a switch member S, and an auxiliary line l.

The collection means 1 are connected by a connection 6 to means 7 for processing and/or transmitting data, which means are conventional and may be constituted by a telephone modem.

The data transmitted from each meter to the collection means include a meter identity code. The collection means 1 include transmitter means 1A for transmitting such codes, and storage means 1B for storing data from the various meters.

As a function of the lengths of the common communication lines 2 and 3, conventional relay means (8, 9) are provided on said lines in order to avoid the consequences of attenuation in the transmitted data-conveying signals. Each relay is associated with an identity code of the same type as the meter identity codes. For example, relays may be provided when the length of connection L1 or L2 exceeds 500 meters to 800 meters.

Figure 2:
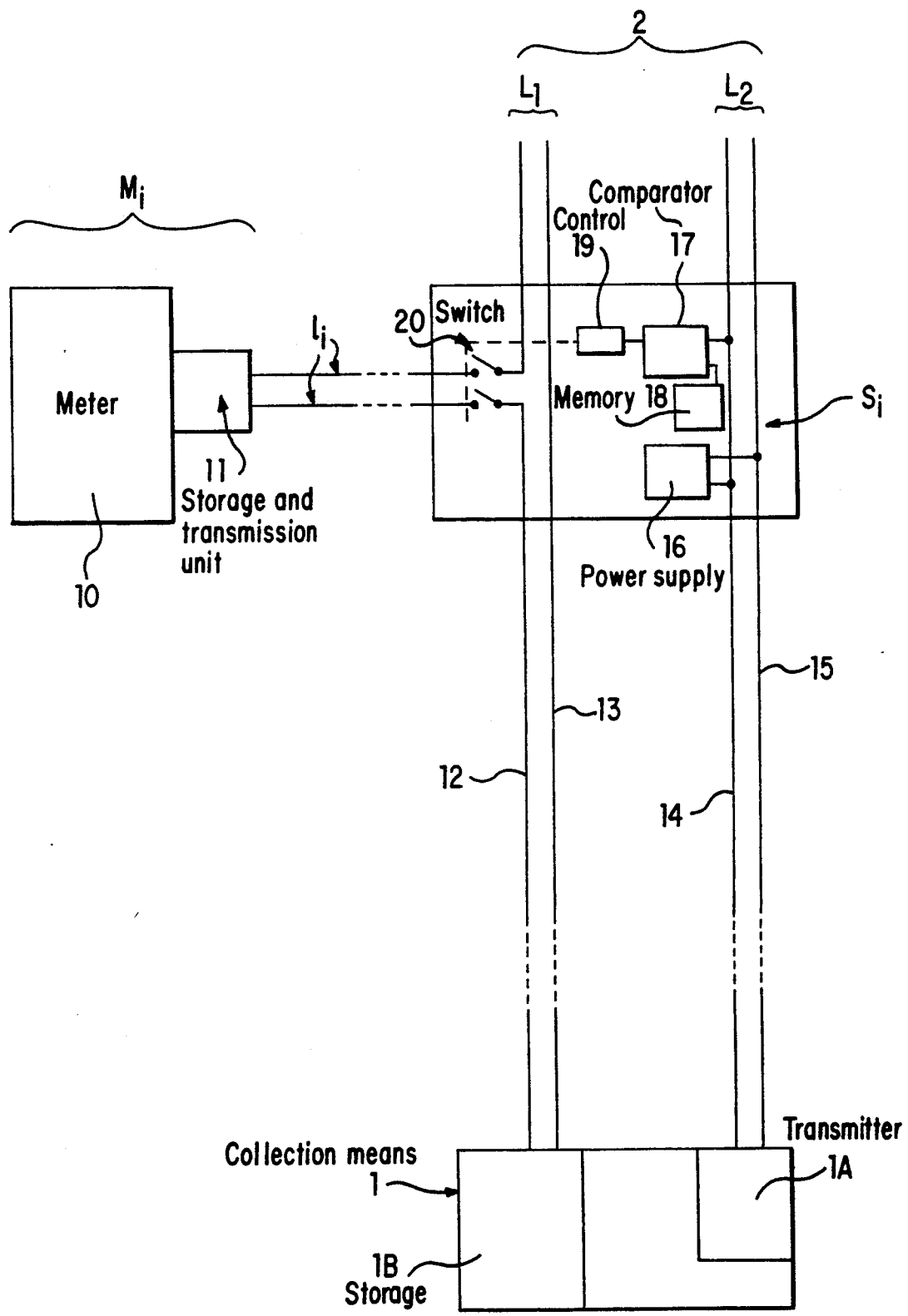
FIG. 2 is a functional electrical diagram of a switch member associated with a meter.

FIG. 2 is an enlarged diagrammatic detail view of the common communication line and of one of the switch members Si associated with meter Mi.

The meter Mi comprises the meter portion 10 per se and the unit 11 for storing and transmitting data. This unit is connected to the switch member Si by auxiliary connection $l_i$, which is constituted by two telephone cables. The unit 11 may be constituted by the device manufactured and sold by the American company Schlumberger Industries, under the name ARB.

The common communication line 1 comprises two parallel connections L1 and L2; the first and second connections L1 and L2 are each respectively constituted by a pair of telephone cables, respectively referenced 12, 13 and 14, 15.

The switch member Si comprises an electrical power supply block 16 connected to the second connection L2 (cables 14, 15), a comparator 17 having one input connected to one of the cables (14) of the connection l2 and its other input connected to a memory 18 containing the identity signal specific to the switch member Si. The output from the comparator is applied to a control 19 of a switch 20 (normally open) placed on the auxiliary connection $l_i$, with the switch serving to connect the first connection L1 (cables 12 and 13) to the meter Mi.

Operation, described schematically, is as follows.

The collection means 1 use the transmitter means 1A to transmit an identity signal bearing the code specific to one of the switches Si, and thus to a given meter Mi. Each code is constituted by a signal that may either be analog (e.g. a given frequency), or else digital (e.g. a sequence of eight bits). Said signal is transmitted by cable 14 of connection L2 along both common lines 2 and 3. Each comparator 17 (provided in each of the switches Si) compares the transmitted signal with the signal stored in its memory 18 and specific to the associated meter Mi. When the transmitted signal is identical to the stored signal, then the comparator 17 acts on the control 19 which is constituted by a bistable and causes the switch 20 to close. The storage and transmission unit 11 of the corresponding meter Mi is then connected to the collection means 1 via the connection $l_i$ and the connection L1. The unit 11 is then also powered by the switch 20 closing, and it transmits data which is conveyed to the collection means 1 by the connection L1.

The transmitter means 1A of the collection means retransmit the identity signal of the meter Mi as soon as all of the meter data has been conveyed to the memory 1B. At this instant, the comparator 17 acts on the bistable 19 which returns to its initial state in such a manner as to cause the switch 20 is open again.

The transmitter means 1A thus transmit the identity signal of a meter a first time to close the switch 20 and a second time to open it again. The time interval between the first and second signals specific to a same meter Mi corresponds to the time required for transmitting data from said meter over the connection L1. Thereafter, a different identity signal is transmitted, specific to the next meter.

Further, to interrogate meters Mi situated beyond a given connection distance, e.g. about 500 meters to about 800 meters, relay means such as the relay 9 are provided.

Figure 3:
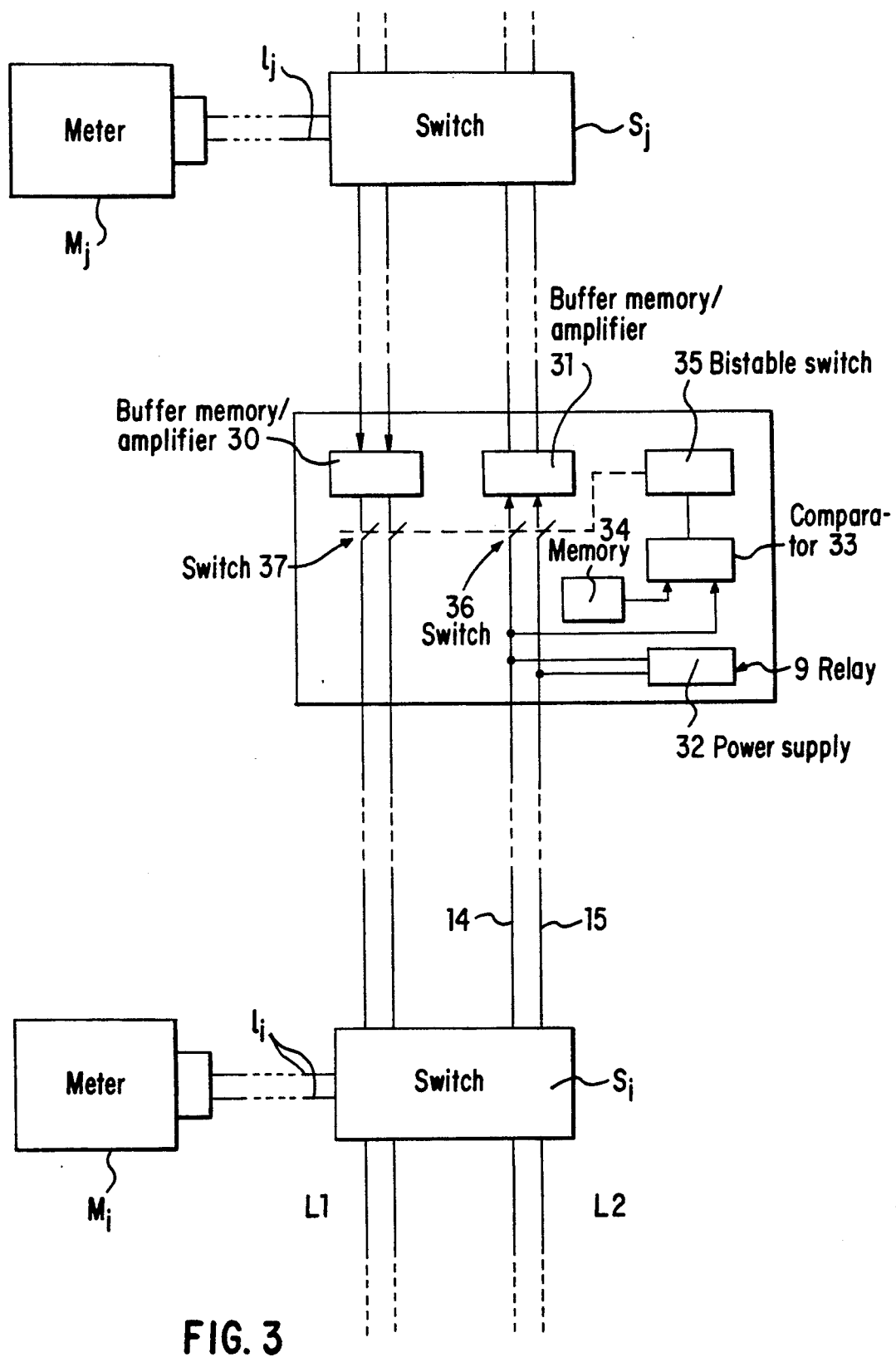
FIG. 3 is an enlarged diagram of a relay.

FIG. 3 shows a relay 9 in detail, comprising a first buffer memory/amplifier 30 and a second buffer memory/amplifier 31 disposed respectively on the lines L1 and L2, an electrical power supply block 32 connected to the connection L2, and a comparator 33 having one input connected to cable 14 of connection L2 and having its other input connected to a memory 34 suitable for storing the identity signal specific to the relay. The output from the comparator 33 is applied to a control device such as a bistable 35 connected to two switches 36 and 37 placed on respective ones of the connections L2 and L1, upstream from the respective buffer memories 30 and 31.

The collection means transmit the signal specific to be relay 9 via L2, which signal is compared by the comparator 33 with the identity signal specific to the relay as stored in the memory 34. When the received signal is identical to the stored signal, the comparator 33 actuates the control 35 which cause the normally open switches 36 and 37 to close. The buffer memory/amplifier 31 is then ready to store and amplify the identity signal specific to a meter Mj situated beyond the relay 9, which signal is conveyed by the connection L2. When said meter Mj transmits the data via L1 (by the process of closing its switch Sj), then its data is amplified by the memory/amplifier 30 prior to reaching the collection means 1.

Once all of the meters Mk associated beyond the relay 9 have been interrogated, the collection means transmit the identity signal specific to said relay a second time in order to cause the bistable 35 to return to its initial state, thereby opening the switches 36 and 37.

In this way, the collection means transmits a succession of identity signals in the following sequence: close relay, close meter mi, open meter Mi, ..., close meter Mj, open meter Mj, open relay.

The first connection L1 is for transmitting data while the second connection L2 is used for power supply purposes and for controlling each of the switches Si.

Advantageously, the transmitted identity signal is not the identify signal of a given meter, but a code specific to a given switch Si. This makes it possible to change meters without having to change the code for used for controlling the switch Si.

The system of the invention has other advantages.

Its cost is low. The connections L1 and L2 are constituted by telephone cables and the connections between telephone cables and the connections means, the switches, and the meter units, are provided by conventional members that are simple and cheap. Finally, the switches may be implemented using circuits that are cheap.

The electrical power consumption of each switch is very low (less than 1 mA).

The system is flexible in use in the sense that meters can be added and/or removed without difficulty. It suffices merely to connect a switch to the common line or to remove it. In addition, the auxiliary connections $l_i$ make it possible to adapt the geographical situation of the meters relative to the common line.

In a variant embodiment, the connections L1 and L2 are multiplexed so that only one telephone pair is used.

Figure 4:
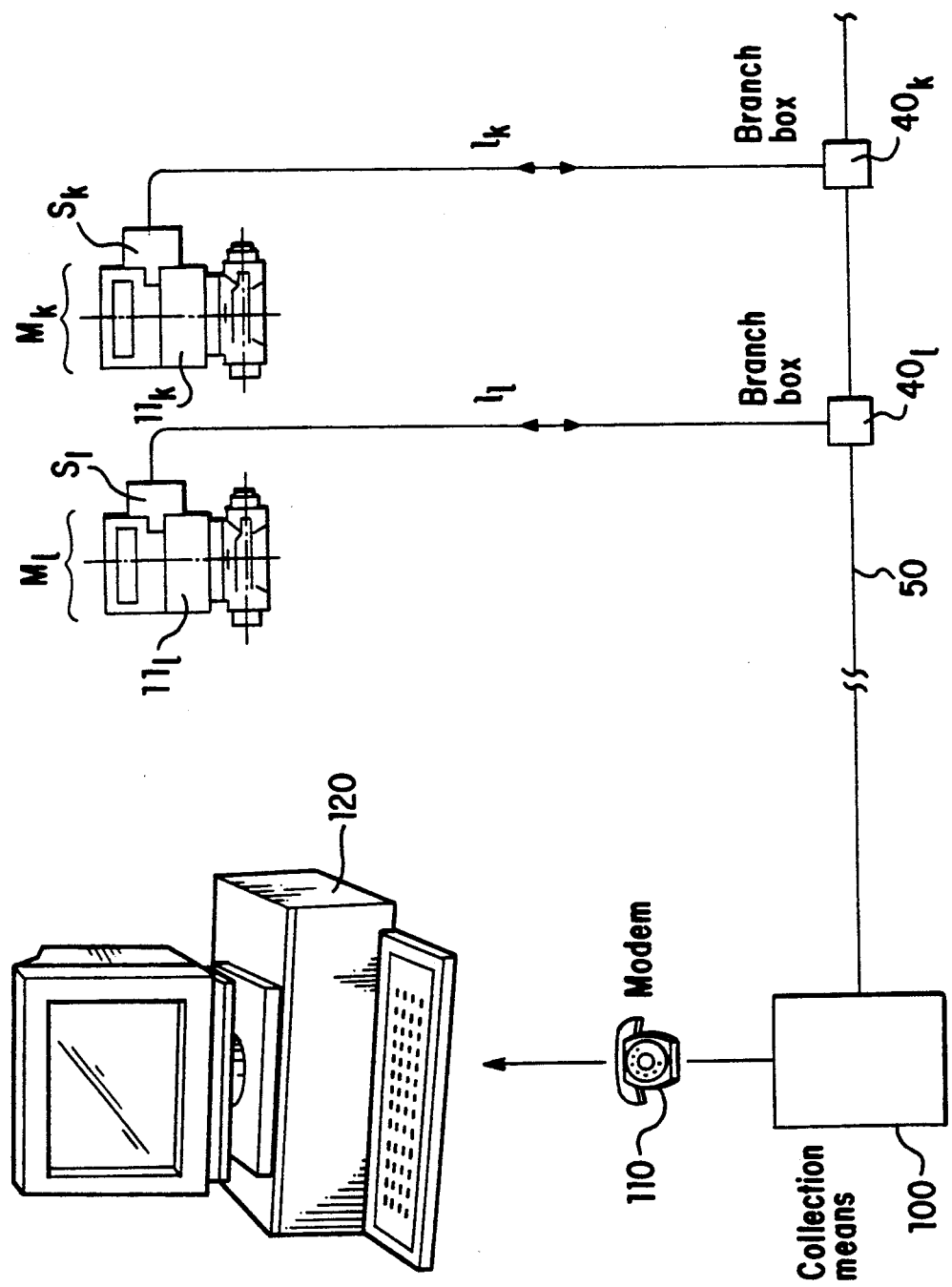
FIG. 4 is a diagram of a second embodiment of a system of the invention.

FIG. 4 shows another embodiment of a system comprising, for example, two meters, namely a water meter Mk and an electricity meter Ml. Each of the meters has a respective storage and transmission unit 11k, 11l containing information relating to water consumption and to electricity consumption. Each meter also includes a memory in which a number specific to the meter is programmed, e.g. its serial number. This memory may be constituted, for example, by the respective storage units 11k and 11l themselves.

The switch members Sk and Sl contained in sockets or housing are respectively connected to the meters Mk and Ml. The switch members Sk and Sl are similar to the switch member described with reference to FIG. 2. They also contain respective memories in which the reference signal associated with the corresponding switch is stored. This signal preferably corresponds to the physical address of the switch, e.g. its billing address.

The switch members Sk and Sl are connected via the auxiliary lines $l_k$ and $l_1$ to a common communication line 50 via branch boxes 40k and 40l. The common communication line 50 terminates at collection means 100 similar to those described with reference to FIG. 1 and connected by means of a telephone modem 110 to a processing center 120.

Thus, when the collection means transmit an identity signal bearing a code specific to switch Sk, for example, storage and transmission unit 11k sends information relating to the number of meter Mk to the collection means, together with information relating to consumption.

Consequently, each interrogation of the meter Mk makes it possible to update, where necessary, the number specific to the meter Mk connected to switch Sk as recorded to the collection means 100. Thus, when a meter Mk is changed at a switch Sk, there is no need for manually keying information into the collection means 100 concerning the number of the newly installed meter.

We claim:

1. A system for remote transfer and collection of data such as quantity of energy or fluid measured by meters, each meter including a data storage and transmission unit, said system comprising:

collection means collected to a common wire connection; and normally open addressable switch members disposed between said common wire connection and each of said meters, each said switch member including means responsive to a unique interrogation signal sent by the collection means over said common wire connection for closing said switch member and thereby enabling a stream of data to pass from a data transmission unit associated with a meter to said collection means; and wherein each data storage unit contains data relating to the identity of its associated meter, which data is independent of the address of the associated switch member which address corresponds to the physical address of the switch member, wherein each corresponding data transmission unit includes means for transmitting data indicative of the identity of the meter to said collection means when interrogated.

2. A system according to claim 1 wherein said common wire connection is constituted by two pairs of electrical wires, a first pair for passing data and a second pair for controlling the switch members, each of said switch member including a power source connected to said second pair of wires for feeding electrical power to its associated meter.

3. A system according to claim 1 in which each switch member is connected to the common wire connection and is connected to its corresponding data transmission unit.

4. A system according to claim 1 in which each switch member is connected to an end of an auxiliary link branching from said common wire connection.

* * * * *